(12) United States Patent
Michitaka et al.

(10) Patent No.: US 10,738,156 B2
(45) Date of Patent: Aug. 11, 2020

(54) HYDROPHOBIC GROUP-CONTAINING COPOLYMER

(71) Applicant: NIPPON SHOKUBAI CO., LTD., Osaka (JP)

(72) Inventors: Daisuke Michitaka, Osaka (JP); Hikaru Takahashi, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/560,871

(22) PCT Filed: Mar. 10, 2016

(86) PCT No.: PCT/JP2016/057510
§ 371 (c)(1),
(2) Date: Sep. 22, 2017

(87) PCT Pub. No.: WO2016/152547
PCT Pub. Date: Sep. 29, 2016

(65) Prior Publication Data
US 2018/0118886 A1 May 3, 2018

(30) Foreign Application Priority Data
Mar. 25, 2015 (JP) .................. 2015-063199

(51) Int. Cl.
| | |
|---|---|
| *C08G 65/331* | (2006.01) |
| *C09D 17/00* | (2006.01) |
| *C08F 216/14* | (2006.01) |
| *D21H 21/02* | (2006.01) |
| *C08F 220/06* | (2006.01) |
| *C11D 3/37* | (2006.01) |
| *C08G 81/02* | (2006.01) |
| *C09D 5/02* | (2006.01) |

(52) U.S. Cl.
CPC ........ *C08G 65/3311* (2013.01); *C08F 216/14* (2013.01); *C08F 220/06* (2013.01); *C08G 81/02* (2013.01); *C09D 5/027* (2013.01); *C09D 17/00* (2013.01); *C11D 3/3753* (2013.01); *D21H 21/02* (2013.01); *C08L 2205/22* (2013.01)

(58) Field of Classification Search
CPC .... C08G 65/3311; C08G 81/02; C09D 5/027; C09D 17/00; C11D 3/3753; C08F 216/14; C08F 220/06; D21H 21/02; C08L 2205/22
USPC ...................................................... 524/513
See application file for complete search history.

(56) References Cited

U.S. PATENT DOCUMENTS

| | | |
|---|---|---|
| 2011/0245132 A1 | 10/2011 | Dupont et al. |
| 2011/0251115 A1 | 10/2011 | Dupont et al. |

FOREIGN PATENT DOCUMENTS

| | | |
|---|---|---|
| JP | 58-5398 | 1/1983 |
| JP | 1-174511 | 7/1989 |
| JP | 2003-221798 | 8/2003 |
| JP | 2012-167407 | 9/2012 |
| JP | 2013-028887 | 2/2013 |
| JP | 2013-189586 | 9/2013 |
| JP | 2014-065760 | 4/2014 |
| JP | 2016-065344 | 4/2016 |
| WO | 2010/024448 | 3/2010 |
| WO | 2010/024468 | 3/2010 |
| WO | 2010/024469 | 3/2010 |
| WO | 2014/032264 | 3/2014 |

OTHER PUBLICATIONS

ODA, "Recent Development on the Synthesis of Surface Active Compounds", Journal of Japan Oil Chemists' Society, 977, vol. 26, Issue 10, pp. 606-612—concise explanation included.

*Primary Examiner* — Angela C Scott
(74) *Attorney, Agent, or Firm* — Hamre, Schumann, Mueller & Larson, P.C.

(57) ABSTRACT

The present invention aims to provide a polymer capable of well dispersing hydrophobic particles. The present invention relates to a hydrophobic group-containing copolymer including a structural unit (A) derived from a hydrophobic group-containing monomer that is represented by the formula (1) and a structural unit (B) derived from a carboxylic acid-based monomer. The proportion of the structural unit (A) is from 16% by mass or more to 50% by mass or less based on 100% by mass of the structural units derived from all monomers constituting the copolymer, and the copolymer has a weight average molecular weight of 10,000 to 1,000,000.

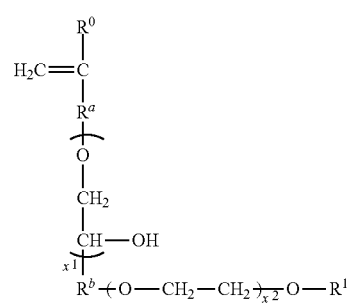

(1)

5 Claims, No Drawings

HYDROPHOBIC GROUP-CONTAINING COPOLYMER

TECHNICAL FIELD

The present invention relates to a hydrophobic group-containing copolymer. Specifically, the present invention relates to a hydrophobic group-containing copolymer useful for pitch control agents, pigment dispersants, and detergent builders.

BACKGROUND ART

Adhesive resin components contained in wood materials and adhesives or synthetic resins mixed into pulps are referred to as "pitch" in papermaking. Pitch particles dispersed in a colloidal state in a pulp slurry aggregate into an enlarged aggregate in water due to their high hydrophobicity. In papermaking, such pitch causes problems such as the formation of a discontinuity or a hole in paper. In order to eliminate pitch to solve such problems, various pitch control agents and methods for suppressing pitch have been examined.

As such a technique, for example, Patent Literature 1 discloses a method for suppressing pitch in a facility including pulp manufacturing equipment for manufacturing pulp from a pulp material by using water. The method includes the step of adding a chelating agent to portions where pulp or an intermediate body thereof is in contact with water in the pulp manufacturing equipment so that a mole ratio (chelating agent/calcium) of the chelating agent to the calcium in the water in the target portions in the pulp manufacturing equipment is one fifth or less. The chelating agent contains one or two or more kinds of an ethylenediaminetetraacetic acid and salts thereof, a diethylenetriaminepentaacetic acid and salts thereof, a triethylenetetraaminehexaacetic acid and salts thereof, and a glycoletherdiaminetetraacetic acid and salts thereof.

In addition, Patent Literature 2 discloses a pitch control agent for papermaking containing, as an active ingredient, a polymer including a constitution unit originating from a specific (meth)acryloyloxy alkyltrialkyl ammonium salt and a constitution unit originating from a specific (meth)acrylic acid or a salt thereof.

Among hydrophobic group-containing copolymers, a copolymer of a hydrophobic group-containing monomer and a carboxylic acid-based monomer or the like is used, for example, as detergent builders. As such a technique, for example, Patent Literature 3 discloses a hydrophobic group-containing copolymer including a structural unit (a) derived from a specific ether linkage-containing monomer (A) and a structural unit (b) derived from a carboxyl group-containing monomer (B), the amount of the structural unit (a) being 1% to 50% by mass and the amount of the structural unit (b) being 50% to 99% by mass based on 100% by mass of the structural units derived from all monomers.

CITATION LIST

Patent Literature

Patent Literature 1: JP 2013-28887 A
Patent Literature 2: JP 2003-221798 A
Patent Literature 3: WO 2010/024448

SUMMARY OF INVENTION

Technical Problem

Although various techniques for eliminating pitch in papermaking are disclosed as described above, polymers for dispersing hydrophobic particles such as pitch are still insufficient in dispersing ability. Therefore, better polymers need to be developed.

The present invention has been made in view of the state of the art, and aims to provide a polymer capable of well dispersing hydrophobic particles.

Solution to Problem

The present inventors investigated various polymers capable of well dispersing hydrophobic particles, and found that a copolymer with a specific weight average molecular weight containing a structural unit derived from a carboxylic acid-based monomer and a structural unit derived from a hydrophobic group-containing monomer at a specific ratio well disperses hydrophobic particles. As a result, the above-mentioned problems have been successfully solved, leading to completion of the present invention.

That is, the present invention relates to a hydrophobic group-containing copolymer including:
  a structural unit (A) derived from a hydrophobic group-containing monomer; and
  a structural unit (B) derived from a carboxylic acid-based monomer,
  the hydrophobic group-containing monomer being represented by the formula (1):

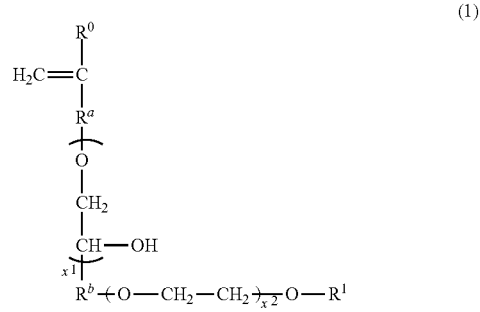

wherein $R^0$ represents a hydrogen atom or a $CH_3$ group; $R^a$ represents a $CH_2$ group, a $CH_2CH_2$ group, or a direct bond; $R^b$ represents a $CH_2$ group, a $CH_2CH_2$ group, or a direct bond; $X^1$ represents the number of units represented by (O—$CH_2$—CH(OH)) and is 0 or 1; $X^2$ represents the number of units represented by (O—$CH_2$—$CH_2$) and is 0 to 5, where $X^2$ is 1 to 5 when $R^a$ and $R^b$ are direct bonds and $X^1$ is 0; and $R^1$ represents a C1-C20 hydrophobic organic group,
  the proportion of the structural unit (A) being from 16% by mass or more to 50% by mass or less based on 100% by mass of the structural units derived from all monomers constituting the copolymer,
  the copolymer having a weight average molecular weight of 10,000 to 1,000,000.

The present invention is described in detail below.

Any combination of two or more of the following preferred embodiments according to the present invention is also a preferred embodiment according to the present invention.

The hydrophobic group-containing copolymer of the present invention has a structural unit (A) derived from a hydrophobic group-containing monomer represented by the formula (1) and a structural unit (B) derived from a carboxylic acid-based monomer.

Since the hydrophobic group-containing monomer has a C1-C20 hydrophobic organic group at $R^1$ in the formula (1), the hydrophobic group-containing copolymer of the present invention is well miscible with hydrophobic particles due to hydrophobic interaction, thus prevents the particles from aggregation, and is capable of well dispersing the particles. Accordingly, the aggregation of the hydrophobic particles can be suppressed. In addition, the hydrophobic group-containing copolymer of the present invention having a structural unit (B) derived from a carboxylic acid-based monomer is well water-soluble. Accordingly, the hydrophobic group-containing copolymer of the present invention having a structural unit (A) and a structural unit (B) is capable of well dispersing hydrophobic particles in a hydrophilic solvent such as water.

The proportion of the structural unit (A) is from 16% by mass or more to 50% by mass or less based on 100% by mass of the structural units derived from all monomers constituting the hydrophobic group-containing copolymer of the present invention. When the proportion of the structural unit (A) is 16% by mass or more, the copolymer of the present invention is sufficiently hydrophobic, and when it is 50% by mass or less, the copolymer of the present invention is sufficiently water-soluble.

The proportion of the structural unit (A) is preferably 18% to 50% by mass, more preferably 20% to 49% by mass, still more preferably 21% to 47% by mass, further preferably 25% to 45% by mass, further more preferably 28% to 42% by mass, particularly preferably 30% to 40% by mass.

The proportion of the structural unit (B) in the hydrophobic group-containing copolymer of the present invention is not particularly limited, and is preferably 50% to 84% by mass, more preferably 50% to 82% by mass, still more preferably 51% to 80% by mass, further preferably 53% to 79% by mass, further more preferably 55% to 75% by mass, particularly preferably 58% to 72% by mass, particularly further preferably 60% to 70% by mass based on 100% by mass of the structural units derived from all monomers. When the proportion of the structural unit (B) falls within the preferred ranges, the copolymer of the present invention is more sufficiently water-soluble.

In the present invention, the proportion of the structural unit (B) derived from a carboxylic acid-based monomer is calculated in terms of the corresponding acid. For example, when the structural unit (B) is a structural unit —$CH_2$—$CH$(COONa)— derived from sodium acrylate, the mass proportion (mass %) thereof is calculated in terms of the structural unit —$CH_2$—$CH$(COOH)— derived from acrylic acid which is the corresponding acid.

Similarly, the mass proportion (mass %) of the carboxylic acid-based monomer included in the monomer components is calculated in terms of the corresponding acid. For example, in the case of sodium acrylate, the mass proportion (mass %) thereof is calculated in terms of acrylic acid which is the corresponding acid.

The weight average molecular weight of the hydrophobic group-containing copolymer of the present invention falls within the range of 10,000 to 1,000,000.

A hydrophobic group-containing copolymer having a weight average molecular weight of 10,000 or more has sufficient dispersing ability. The reason for this is considered as follows: the copolymer having a weight average molecular weight of 10,000 or more causes microphase separation and is partly highly hydrophobic.

The weight average molecular weight preferably falls within the range of 10,000 to 500,000, more preferably 10,000 to 100,000, still more preferably 10,000 to 50,000.

The copolymer having a weight average molecular weight falling within the above preferred range can have a more suitable viscosity and is thus excellent in handling. Although a copolymer having a larger weight average molecular weight usually tends to have higher dispersing ability, the hydrophobic group-containing copolymer containing the structural unit (A) at a proportion falling within the above preferred range is capable of sufficiently dispersing even when the weight average molecular weight of the copolymer is small. Therefore, the hydrophobic group-containing copolymer containing the structural unit (A) at a proportion falling within the above preferred range and having a weight average molecular weight falling within the above preferred range is excellent in handling and is capable of more sufficiently dispersing. It is a preferred embodiment of the hydrophobic group-containing copolymer of the present invention that the copolymer has such a proportion of the structural unit (A) and such a weight average molecular weight in combination.

The weight average molecular weight herein can be measured by gel permeation chromatography (GPC) under the following measurement conditions.

The carboxyl group in the hydrophobic group-containing copolymer of the present invention may be of acid type or salt type, and the salt-type carboxyl group preferably accounts for 30 to 90 mol %, more preferably 40 to 80 mol %, still more preferably 50 to 70 mol % of 100 mol % of all carboxyl groups in the hydrophobic group-containing copolymer. The proportion of the salt-type carboxyl group can be controlled within such a preferred range by performing neutralization during or after polymerization reaction or using a carboxylic acid-based monomer where part of the carboxyl groups are of salt type as a starting material in the production method described below.

Hydrophobic Group-Containing Monomer

The hydrophobic group-containing copolymer of the present invention includes a structural unit (A) derived from a hydrophobic group-containing monomer represented by the formula (1). Since the hydrophobic group-containing monomer (hereinafter, also referred to as monomer (a)) has a C1-C20 hydrophobic organic group at $R^1$ in the formula (1), it is well miscible with hydrophobic particles due to hydrophobic interaction, thus prevents the particles from aggregation, and is capable of well dispersing the particles.

Examples of the hydrophobic organic group include, but are not particularly limited to, hydrocarbon groups.

Examples of the hydrocarbon groups include alkyl, alkenyl, alkynyl, cycloalkyl, and aryl groups. Preferred among these hydrocarbon groups are alkyl, alkenyl, and aryl groups, more preferred are alkyl and alkenyl groups, and still more preferred is an alkyl group. The number of carbon atoms of the hydrophobic organic group is preferably 2 to 18, more preferably 3 to 12, still more preferably 4 to 6. A hydrophobic organic group having four or more carbon atoms sufficiently exhibits hydrophobicity. A hydrophobic organic group having six or less carbon atoms more sufficiently enhances the polymerizability.

The hydrophobic organic group may contain a heteroatom as long as the hydrophobicity is maintained, and for example, may have a hydrocarbon group in which a hydrogen atom is replaced with, for example, halogen.

$X^2$ in the formula (1) represents the number of units represented by (O—$CH_2$—$CH_2$) and is 0 to 5. When $X^2$ is 1 to 5, the hydrophobic group-containing monomer has further improved hydrophilicity, and is thus easily copolymerized even by using a hydrophilic solvent such as water.

$X^2$ is preferably 1 to 3.

When $X^2$ is 0, the effects obtained by the hydrophobic group represented by $R^1$ can be sufficiently achieved.

In terms of the hydrophobicity of the copolymer, $X^2$ is more preferably 0.

Since the hydrophobic group-containing copolymer of the present invention in which the hydrophilicity and the hydrophobicity are well balanced is capable of sufficiently dispersing hydrophobic particles in a hydrophilic solvent, $X^2$ is preferably varied depending on, for example, the proportion of the structural unit (B) in the copolymer.

$R^0$ in the formula (1) is a hydrogen atom or a $CH_3$ group, preferably a hydrogen atom.

$R^a$ in the formula (1) is a $CH_2$ group, a $CH_2CH_2$ group, or a direct bond, preferably a $CH_2$ group.

$R^b$ in the formula (1) is a $CH_2$ group, a $CH_2CH_2$ group, or a direct bond, preferably a $CH_2$ group.

When $R^a$ and $R^b$ are direct bonds and $X^1$ is 0, $X^2$ is 1 to 5.

$X^1$ in the formula (1) represents the number of units represented by (O—$CH_2$—CH(OH)) and is 0 or 1. $X^1$ is preferably 1. In this case, since the hydrophobic group-containing monomer contains a hydroxyl group, the water-solubility thereof is enhanced and the polymerizability thereof is further enhanced. The hydrophobic group-containing monomer with such a structure can be sufficiently polymerized even when the proportion of the hydrophobic group-containing monomer is high in the monomer components. The structure represented by (O—$CH_2$—CH(OH)) is formed by reacting, for example, a glycidyl group with a hydroxyl group of an alcohol, an alkylene oxide adduct, or the like.

Examples of the hydrophobic group-containing monomer include compounds prepared by reacting an unsaturated double bond-containing alcohol such as vinyl alcohol, allyl alcohol, or isoprenol with a C4-C6 alkyl glycidyl ether; compounds prepared by reacting an ethylene oxide adduct of the unsaturated double bond-containing alcohol with a C4-C6 halogenated alkyl; and compounds prepared by reacting allyl glycidyl ether with a C4-C6 alcohol or an ethylene oxide adduct of a C4-C6 alcohol.

The number of carbon atoms is the same as that of the above-described hydrophobic organic group.

The hydrophobic group-containing monomer is preferably a compound represented by the formula (2):

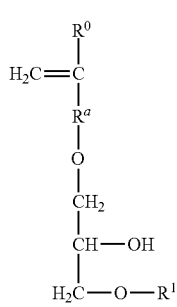

(2)

wherein $R^0$ represents a hydrogen atom or a $CH_3$ group; $R^a$ represents a $CH_2$ group, a $CH_2CH_2$ group, or a direct bond; and $R^1$ represents a C1-C20 hydrophobic organic group.

$R^0$ is preferably a hydrogen atom, and $R^a$ is preferably a $CH_2$ group.

Specific and preferred examples of the hydrophobic organic group in the formula (2) are as described above.

Carboxylic Acid-Based Monomer

The hydrophobic group-containing copolymer of the present invention has a structural unit (B) derived from a carboxylic acid-based monomer.

The carboxylic acid-based monomer (hereinafter, also referred to as monomer (b)) contains an unsaturated double bond (carbon-carbon double bond) and a carboxy group and/or a carboxylate group.

The hydrophobic group-containing copolymer of the present invention containing a structural unit (B) is well water-soluble.

Here, "contains a carboxy group and/or a carboxylate group" means that one molecule contains one or more groups represented by —COOZ (Z represents a hydrogen atom, a metal atom, an ammonium group, or an organic amine group). Examples of the metal atom include alkali metals such as sodium, lithium, potassium, rubidium, and cesium; alkaline-earth metals such as magnesium, calcium, strontium, and barium; aluminum; and iron. Examples of the organic amine group include alkanolamine groups such as a monoethanolamine group, a diethanolamine group, and a triethanolamine group; alkylamine groups such as a monoethylamine group, a diethylamine group, and a triethylamine group; and polyamine groups such as an ethylenediamine group and a triethylenediamine group. In particular, the carboxylate group is more preferably of an ammonium salt, sodium salt, or potassium salt, still more preferably of a sodium salt.

The carboxylic acid-based monomer is preferably an unsaturated monocarboxylic acid-based monomer that contains an unsaturated double bond and one carboxy group (or carboxylate group) in a molecule or an unsaturated dicarboxylic acid-based monomer that contains a unsaturated double bond and two carboxy groups (or carboxylate groups) in a molecule.

Specific examples of the unsaturated monocarboxylic acid-based monomer include unsaturated carboxylic acids such as acrylic acid, methacrylic acid, crotonic acid, α-hydroxyacrylic acid, and α-hydroxymethyl acrylic acid, and derivatives thereof and salts of the unsaturated carboxylic acids.

Specific examples of the unsaturated dicarboxylic acid-based monomer include unsaturated dicarboxylic acids such as maleic acid, itaconic acid, citraconic acid, and fumaric acid, and salts and anhydrides thereof. In addition, these unsaturated dicarboxylic acid-based monomers may form half esters with a C1-C22 alcohol, half amides with a C1-C22 amine, and half esters with a C2-C4 glycol; and maleamic acid may form a half amide with a C2-C4 glycol, for example.

Preferred among these carboxylic acid-based monomers are acrylic acid, salts of the acrylic acid, maleic acid, and salts of the maleic acid. In particular, more preferably, acrylic acid or a salt of the acrylic acid is essential.

The hydrophobic group-containing copolymer of the present invention may optionally contain a structural unit (E) derived from a monomer other than the carboxylic acid-based monomers and hydrophobic group-containing monomers. The hydrophobic group-containing copolymer may contain one or two or more structural units (E).

The monomer other than the carboxylic acid-based monomers and hydrophobic group-containing monomers (hereinafter, also referred to as monomer (e)) may be any monomer copolymerizable with the monomers (a) and (b). The monomer (e) can be appropriately selected depending on desired effects.

Specific examples of the monomer (e) include sulfonic acid (salt) group-containing monomers such as vinylsulfonic acid, styrenesulfonic acid, (meth)allylsulfonic acid, 3-(meth)allyloxy-2-hydroxypropanesulfonic acid, 3-(meth)allyloxy-1-hydroxypropanesulfonic acid, 2-(meth) allyloxyethylenesulfonic acid, 2-acrylamide-2-methylpropanesulfonic acid and salts thereof; polyalkylene glycol chain-containing monomers (excluding the monomers corresponding to the monomer (a)) such as monomers prepared by adding an alkylene oxide to an unsaturated alcohol (e.g., (meth)allyl alcohol and isoprenol) and (meth) acrylic acid esters of alkoxy alkylene glycols; vinyl aromatic monomers containing a heterocyclic aromatic hydrocarbon group, such as vinyl pyridine and vinyl imidazole; amino group-containing monomers such as dialkylaminoalkyl (meth)acrylates (e.g., dimethylaminoethyl acrylate, dimethylaminoethyl methacrylate, and dimethylaminopropyl acrylate), dialkylaminoalkyl (meth)acrylamides (e.g., dimethylaminoethyl acrylamide, dimethylaminoethyl methacrylamide, and dimethylaminopropyl acrylamide), allylamines such as diallylalkylamines (e.g., diallylamine and diallyldimethylamine) and quaternized compounds of these amino group-containing monomers; N-vinyl monomers such as N-vinylpyrrolidone, N-vinylformamide, N-vinylacetamide, N-vinyl-N-methylformamide, N-vinyl-N-methylacetamide, and N-vinyl oxazolidone; amide monomers such as (meth)acrylamide, N,N-dimethylacrylamide, and N-isopropylacrylamide; hydroxyl group-containing monomers such as (meth)allyl alcohol and isoprenol; (meth)acrylic acid alkyl ester monomers such as butyl (meth)acrylate, 2-ethylhexyl (meth)acrylate, and dodecyl (meth)acrylate; (meth)acrylic acid hydroxyalkyl monomers such as 2-hydroxyethyl (meth)acrylate, 2-hydroxypropyl (meth)acrylate, 2-hydroxybutyl (meth)acrylate, 4-hydroxybutyl (meth)acrylate, and 2-hydroxyhexyl (meth)acrylate; vinyl aryl monomers such as styrene, indene, and vinylaniline; isobutylene; and vinyl acetate.

The quaternized compounds are obtained by reacting the amino group-containing monomers with common quaternizing agents. Examples of the quaternizing agents include alkyl halides and dialkyl sulfates.

The amount of the structural unit (E) derived from the optional monomer (e) is preferably 0% to 40% by mass, more preferably 0% to 20% by mass, still more preferably 0% to 10% by mass, particularly preferably 0% by mass based on 100% by mass of the total amount of the structural units derived from all monomers constituting the hydrophobic group-containing copolymer (i.e., the total amount of the structural units (A), (B), and (E)).

In the case of the structural unit (E) derived from an amino group-containing monomer, the mass proportion of the structural unit (E) based on the total amount of the structural units derived from all monomers and the mass proportion of the amino group-containing monomer based on the total amount of all monomers are each calculated as a mass proportion of the corresponding unneutralized amine. For example, when the monomer (e) is a vinylamine hydrochloride, the mass proportion (% by mass) of a vinylamine which is the corresponding unneutralized amine is calculated.

The mass proportion (% by mass) of a quaternized amino group-containing monomer or a structural unit derived from the monomer is calculated without considering (without including) the mass of the counter anion.

In the case of the structural unit (E) derived from an acid group-containing monomer, the mass proportion (% by mass) of the structural unit (E) based on the total amount of the structural units derived from all monomers is calculated in terms of the corresponding acid. The mass proportion (% by mass) of the acid group-containing monomer based on the total amount of all monomers is also calculated in terms of the corresponding acid.

Method of Producing Hydrophobic Group-Containing Copolymer

The hydrophobic group-containing copolymer of the present invention may be produced by any method, and may be produced, for example, by polymerizing the monomer components.

The monomer components used in the production of the hydrophobic group-containing copolymer of the present invention essentially include the carboxylic acid-based monomer and the hydrophobic group-containing monomer, and may optionally include a different monomer.

The carboxylic acid-based monomer may be an acid-type monomer or a base-type (neutralized-type) monomer.

The proportions of the carboxylic acid-based monomer, the hydrophobic group-containing monomer, and the different monomer included in the monomer components are as described above.

Neutralization

In cases where the carboxylic acid-based monomers included in the monomer components are all acid-type monomers or partly salt-type monomers, neutralization may be performed during and/or after the polymerization reaction.

Preferably, neutralization is performed after the polymerization reaction. Corrosion of metal containers can be sufficiently suppressed by bringing the pH close to neutral after the polymerization.

In the neutralization, an alkali component is preferably used.

The alkali component may be commonly used one, and specific examples thereof may be the same as those described in WO 2011/158945.

The alkali component is preferably an alkali metal hydroxide, more preferably sodium hydroxide.

The amount of the alkali component used in the neutralization may be set such that the proportion of the salt of a carboxyl group based on all the carboxyl groups of the hydrophobic group-containing copolymer falls within the above range.

Polymerization Initiator

The carboxylic acid-based water-soluble polymer of the present invention is preferably prepared by polymerizing the monomer components in the presence of a polymerization initiator (hereinafter, also referred to as an initiator).

The polymerization initiator may be a commonly used polymerization initiator, and preferred examples thereof include persulfates, hydrogen peroxide, azo compounds, and organic peroxides. Specific examples thereof may be the same as those described in WO 2010/024448. Each of these polymerization initiators may be used alone, or two or more of these may be used in the form of a mixture. One of these polymerization initiators is preferably used alone, so that the molecular weight distribution of the polymer is likely to be small. The polymerization initiator is preferably a persulfate, more preferably sodium persulfate.

The amount of the polymerization initiator is not particularly limited, and is preferably 10 g or less, more preferably 1 to 5 g per mole of all the monomer components.

Chain Transfer Agent

In the method of producing the carboxylic acid-based water-soluble polymer of the present invention, a chain transfer agent can also be used in addition to the polymerization initiator. In this case, the chain transfer agent may be any compound capable of adjusting molecular weight, and may be a commonly used chain transfer agent. Specific examples thereof include thiol chain transfer agents; halides; secondary alcohols; phosphorous acid, phosphites, hypophosphorous acid, and hypophosphites; and lower oxides such as sulfurous acid, bisulfite, dithionous acid, metabisulfurous acid, and salts thereof (e.g., sodium bisulfite, potassium bisulfite, sodium dithionite, potassium dithionite, sodium metabisulfite, and potassium metabisulfite). Specific examples thereof may be the same as those described in WO 2010/024448. Each of the chain transfer agents may be used alone, or two or more of these may be used in the form of a mixture.

Preferred among these chain transfer agents are sulfurous acid and sulfites. That is, at least sulfurous acid and/or a sulfite (hereinafter, referred to as "sulfurous acid (salt)") is preferably used as the chain transfer agent.

The sulfurous acid (salt) refers to sulfurous acid, bisulfite, or salts thereof, and is preferably a salt of sulfurous acid or bisulfite. In addition to the above examples, the salt of sulfurous acid or bisulfite may preferably be a salt of a metal atom, ammonium, or organic ammonium. Preferred examples of the metal atom include monovalent metal atoms such as alkali metals (e.g., lithium, sodium, and potassium); divalent metal atoms such as alkaline earth metals (e.g., calcium and magnesium); and trivalent metal atoms such as aluminum and iron. Suitable examples of the organic ammonium (organic amine) include alkanolamines such as ethanolamine, diethanolamine, and triethanolamine; and triethylamine. Ammonium may also be mentioned. Thus, examples of sulfites preferably used in the present invention include sodium bisulfite, potassium bisulfite, ammonium bisulfite, sodium sulfite, potassium sulfite, and ammonium sulfite. Sodium bisulfite is particularly preferred.

Each sulfurous acid (salt) may be used alone, or two or more of sulfurous acids (salts) may be used in the form of a mixture.

The amount of the chain transfer agent added is not particularly limited, and is preferably 1 to 20 g, more preferably 2 to 15 g per mole of all the monomer components. An amount of less than 1 g may fail to control the molecular weight, whereas an amount of more than 20 g may produce residual chain transfer agents and decrease the polymer purity.

Decomposition Catalyst, Reducing Compound

In the method of producing the hydrophobic group-containing copolymer of the present invention, a decomposition catalyst for polymerization initiators and a reducing compound (also referred to as a reaction accelerator) may be used (may be added to the polymerization system) in addition to the polymerization initiator.

Examples of compounds functioning as the decomposition catalyst for polymerization initiators and the reducing compound include heavy metal ions (or heavy metal salts). That is, in the method of producing the hydrophobic group-containing copolymer of the present invention, a heavy metal ion (or heavy metal salt) may be used (may be added to the polymerization system) in addition to the polymerization initiator and the like. The heavy metal ion herein refers to a metal with a specific gravity of 4 $g/cm^3$ or more.

Specific examples of the heavy metal ion may be the same as those described in WO 2010/024448. Each of these heavy metals may be used alone, or two or more of these may be used. Preferred among these is iron.

The ionic valence of the heavy metal ion is not limited. For example, in the case of using iron as the heavy metal, the iron ion in the initiator may be $Fe^{2+}$, $Fe^{3+}$, or a combination of these.

In the case of using iron as the heavy metal ion, a heavy metal salt such as Mohr's salt (Fe $(NH_4)_2$ $(SO_4)_2 \cdot 6H_2O$) ferrous sulfate heptahydrate, ferrous chloride, or ferric chloride is preferably used.

The amount of the heavy metal ion is preferably 0.1 to 10 ppm based on the total mass of the polymerization reaction solution at the end of the polymerization reaction (when neutralization is performed after the polymerization reaction, after the neutralization). When the amount of the heavy metal ion is 0.1 ppm or more, the effects due to the heavy metal ion are sufficiently imparted. When the amount of the heavy metal ion is 10 ppm or less, a polymer with excellent color tone can be obtained.

In the method of producing the hydrophobic group-containing copolymer of the present invention (aqueous solution), a pH regulator, a buffer, or the like may be used if necessary in addition to the polymerization initiator, chain transfer agent, and reaction accelerator.

Polymerization Solution

The hydrophobic group-containing copolymer of the present invention is preferably produced by solution polymerization. The solvent usable for the production is preferably water or a solvent mixture in which 50% by mass of the entire solvent is water. Use of only water as a solvent is more preferred. An organic solvent usable with water in the polymerization may be any organic solvent commonly used, and specific examples thereof may be the same as those described in WO 2010/024448.

The polymerization reaction is performed so that the solids concentration after completion of the polymerization (which is a concentration of nonvolatile matter in the solution as measured by the method described below) is preferably 10% to 60% by mass, more preferably 15% to 50% by mass, still more preferably 20% to 45% by mass based on 100% by mass of the polymerization solution.

Other Production Conditions

The temperature for the polymerization is preferably 70° C. or higher, more preferably 75° C. to 110° C., still more preferably 80° C. to 105° C.

The pressure in the reaction system of the polymerization reaction may be any of ordinary pressure (atmospheric pressure), reduced pressure, and increased pressure.

The atmosphere in the reaction system may be any atmosphere, and may be air atmosphere or inert atmosphere. The reaction is preferably performed in air atmosphere in terms of cost.

The production method of the present invention may optionally include an aging step after the addition of all the materials so that the polymerization rate of the monomers increases, for example. The aging time is usually 1 to 120 minutes, preferably 10 to 100 minutes, more preferably 30 to 60 minutes. If the aging time is less than one minute, unreacted monomer components are possibly left due to insufficient aging, and impurities derived from the unreacted monomers tend to be formed, causing a reduction in performance.

The preferred temperature of the polymer solution in the aging step falls within the same range of the above polymerization temperature.

Use of Hydrophobic Group-Containing Copolymer

The hydrophobic group-containing copolymer of the present invention (or a polymer composition containing the copolymer) can be suitable, for example, for pitch control agents and pigment dispersants because of the high ability of the copolymer to disperse hydrophobic particles, and can also be suitable, for example, for detergent builders and detergent compositions.

The uses of pitch control agents, pigment dispersants, detergent builders, and detergent compositions are exemplified below, and the use of the hydrophobic group-containing copolymer of the present invention for these uses is described.

Pitch Control Agent

Another aspect of the present invention relates to a pitch control agent containing the hydrophobic group-containing copolymer of the present invention.

The amount of the hydrophobic group-containing copolymer in the pitch control agent is not limited, and is preferably 20% to 100% by mass, more preferably 50% to 100% by mass based on 100% by mass of the pitch control agent.

The pitch control agent may optionally contain an additive in addition to the hydrophobic group-containing copolymer. Examples of the additive include, but are not particularly limited to, chelating agents, surfactants, and conventional pitch control agents.

Examples of the chelating agents include, but are not particularly limited to, aminocarboxylic acids (salts) such as ethylenediaminetetraacetic acid (EDTA), diethylenetriaminepentaacetic acid (DTPA), and salts thereof; phosphonic acids such as hydroxyethylidene diphosphonic acid; and carboxylic acids (salts) such as citric acid, succinic acid, oxalic acid, phthalic acid, malic acid, tartaric acid, and salts thereof.

Examples of the surfactants include, but are not particularly limited to, nonionic surfactants such as polyoxyethylene alkyl ethers.

Examples of the conventional pitch control agents include, but are not particularly limited to, talc, cationic polymers, solvents, and enzymes.

The amount of the additive in the pitch control agent is not particularly limited, and is preferably 0% to 80% by mass, more preferably 0% to 50% by mass based on 100% by mass of the pitch control agent.

Pigment Dispersant

Another aspect of the present invention is a pigment dispersant containing the hydrophobic group-containing copolymer of the present invention.

The amount of the hydrophobic group-containing copolymer in the pigment dispersant is not particularly limited, and is preferably 20% to 100% by mass, more preferably 50% to 100% by mass based on 100% by mass of the pigment dispersant.

The pigment dispersant may optionally contain an additive in addition to the hydrophobic group-containing copolymer. Examples of the additive include, but are not particularly limited to, condensed phosphoric acids and salts thereof, phosphonic acids and salts thereof, and polyvinyl alcohol.

The amount of the additive in the pigment dispersant is not particularly limited, and is preferably 0% to 80% by mass, more preferably 0% to 50% by mass based on 100% by mass of the pigment dispersant.

Detergent Builder/Detergent Composition

Another aspect of the present invention relates to a detergent builder or detergent composition which contains the hydrophobic group-containing copolymer of the present invention.

The amount of the hydrophobic group-containing copolymer in the detergent composition is not particularly limited, and in order to enhance the performance as a builder, the amount of the hydrophobic group-containing copolymer is preferably 0.1% to 15% by mass, more preferably 0.3% to 10% by mass, still more preferably 0.5% to 5% by mass based on the total amount of the detergent composition.

The detergent composition used for detergents usually contains a surfactant and/or an additive for detergents. The specific forms of the surfactant and additive are not particularly limited, and common knowledge in the detergent field is appropriately referable. Also, the detergent composition may be a powder detergent composition or a liquid detergent composition.

The surfactant is one or two or more surfactants selected from the group consisting of anionic surfactants, nonionic surfactants, cationic surfactants, and amphoteric surfactants. In the case of using two types or more surfactants in combination, the total amount of the anionic surfactant(s) and the nonionic surfactant(s) is preferably 50% by mass or more, more preferably 60% by mass or more, still more preferably 70% by mass or more, particularly preferably 80% by mass or more based on the total amount of the surfactants.

Suitable examples of the anionic surfactants include alkyl benzene sulfonates, alkyl ether sulfates, alkenyl ether sulfates, alkyl sulfates, alkenyl sulfates, α-olefin sulfonates, α-sulfonated fatty acid or esters thereof, alkane sulfonates, saturated fatty acid salts, unsaturated fatty acid salts, alkyl ether carboxylates, alkenyl ether carboxylates, amino acid-based surfactants, N-acylamino acid-based surfactants, alkylphosphoric acid esters or salts thereof, and alkenylphosphoric acid esters or salts thereof. The alkyl group or alkenyl group in these anionic surfactants may have an alkyl group such as a methyl group as a branched chain.

Suitable examples of the nonionic surfactants include polyoxyalkylene alkyl ethers, polyoxyalkylene alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, and alkylamine oxides. The alkyl group or alkenyl group in these nonionic surfactants may have an alkyl group such as a methyl group as a branched chain.

Suitable examples of the cationic surfactants include quaternary ammonium salts. Suitable examples of the amphoteric surfactants include carboxylic amphoteric surfactants and sulfobetaine-type amphoteric surfactants. The alkyl group or alkenyl group in these cationic surfactants and amphoteric surfactants may have an alkyl group such as a methyl group as a branched chain.

The proportion of the surfactant blended is typically 10% to 60% by mass, preferably 15% to 50% by mass, more preferably 20% to 45% by mass, particularly preferably 25% to 40% by mass, based on the total amount of the detergent composition. The use of too small an amount of the surfactant may result in insufficient washing performance, and the use of too large an amount of the surfactant is disadvantageous in terms of cost.

Suitable examples of the additive include antiredeposition agents for preventing redeposition of pollutants (e.g., an alkali builder, a chelate builder, carboxymethylcellulose sodium), anti-fouling agents (e.g., benzotriazol, ethylenethiourea), soil release agents, dye transfer inhibitors, softening agents, alkaline substances for pH regulation, perfumes, solubilizing agents, fluorescence agents, colorants, frothing agents, foam stabilizers, lustering agents, germicides, bleaching agents, bleaching assistants, enzymes, dyes, and solvents. In the case of a powder detergent composition, zeolite is preferably blended.

The detergent composition may contain a different detergent builder in addition to the hydrophobic group-containing copolymer of the present invention. Examples of the different detergent builder include, but are not particularly limited to, alkali builders such as carbonates, hydrogencarbonates, and silicates; chelate builders such as tripolyphosphates, pyrophosphates, Glauber's salt, nitrilotriacetates, ethylenediamine tetraacetates, citrates, salts of (meth)acrylic acid copolymers, acrylic acid-maleic acid copolymers, fumarates, and zeolite; and carboxyl derivatives of polysaccharides such as carboxymethyl cellulose. Examples of counter salts used with these builders include alkaline metals such as sodium and potassium, ammonium, and amines.

Typically, the proportion of the combined amount of the additive and the different detergent builder blended is preferably 0.1% to 50% by mass, more preferably 0.2% to 40% by mass, still more preferably 0.3% to 35% by mass, particularly preferably 0.4% to 30% by mass, most preferably 0.5% to 20% by mass based on 100% by mass of the detergent composition. The use of less than 0.1% by mass of the additive and the different builder may result in insufficient washing performance, and the use of more than 50% by mass of the additive and the different builder is disadvantageous in terms of cost.

The concept of the detergent composition includes synthetic detergents of household detergents, detergents for industrial use such as detergents used in the fiber industry, and hard surface detergents, and also includes detergents used only for specific usages such as a bleaching detergent in which the performance delivered by one component is improved.

When the detergent composition is a liquid detergent composition, the water content of the liquid detergent composition, typically, is preferably 0.1% to 75% by mass, more preferably 0.2% to 70% by mass, still more preferably 0.5% to 65% by mass, even more preferably 0.7% to 60% by mass, particularly preferably 1% to 55% by mass, most preferably 1.5% to 50% by mass based on the total amount of the liquid detergent composition.

Suitable examples of enzymes that can be mixed in the detergent composition include proteases, lipases, and cellulases. Preferred among these are proteases, alkali lipases, and alkali cellulases because of their high activity in an alkali-washing liquid.

The amount of the enzyme is preferably 5% by mass or less based on 100% by mass of the detergent composition. An amount of the enzyme of more than 5% by mass may not improve the washing performance any more, and may be disadvantageous in terms of cost.

The detergent composition does not cause much deposition of salts and achieves excellent washing performance even when used in an area in which hard water with a high concentration of calcium ions or magnesium ions (for example, 100 mg/L or more) is used. Such high performance is observed particularly in cases where the detergent composition contains an anionic surfactant such as LAS.

Advantageous Effects of Invention

The hydrophobic group-containing copolymer of the present invention has the above-described features and well disperses hydrophobic particles, and is therefore suitable for pitch control agents, pigment dispersants, detergent builders, and detergent compositions. The hydrophobic group-containing copolymer of the present invention is also suitable, for example, for water treatment agents, anti-scaling agents, anti-scaling agents for RO membranes, and anti-scaling agents for oil fields.

DESCRIPTION OF EMBODIMENTS

The following examples illustrate the present invention in more detail. They are, however, by no means limitative of the scope of the invention. Unless otherwise mentioned, the term "part(s)" means "part(s) by weight" and "%" means "% by mass".

Conditions for Measuring Weight Average Molecular Weight

Apparatus: High performance GPC apparatus (HLC-8320GPC) produced by Tosoh Corporation
Detector: RI
Column: SHODEX Asahipak GF-310-HQ, GF-710-HQ, GF-1G 7B produced by Showa Denko K.K.
Column temperature: 40° C.
Flow rate: 0.5 mL/min
Calibration curve: POLYACRYLIC ACID STANDARD produced by Sowa Kagaku Co., Ltd.
Eluent: 0.1 N sodium acetate/acetonitrile=3/1 (mass ratio)

Example 1

(Synthesis of Monomer)

A 500-mL four-necked glass flask equipped with a reflux condenser and a stirrer (paddle fins) was charged with 370.0 g of n-butyl alcohol and 4.27 g of pelletized sodium hydroxide. The temperature was raised to 60° C. while stirring. Next, 57.0 g of allyl glycidyl ether (hereinafter, also referred to as "AGE") was added over 30 minutes and then reacted for 5 hours. The resulting solution was transferred to a 1,000-mL recovery flask, and the solvent was removed with a rotary evaporator. To the recovery flask was added 200.0 g of a 20% by mass aqueous solution of sodium chloride.

The resulting aqueous solution was transferred to a 500-mL separately funnel, sufficiently shaken, and allowed to stand until the phases separated. Then, the lower phase was removed. The remaining upper phase was transferred to a 300-mL recovery flask, and the solvent was removed with a rotary evaporator. The precipitated salt was removed by filtration. Thus, a monomer (1) was obtained.

Polymerization

A 1,000-mL glass separable flask equipped with a reflux condenser and a stirrer (paddle fins) was charged with 100.0 g of pure water and 0.0116 g of Mohr's salt. The temperature was raised to 85° C. while stirring to prepare a polymerization reaction system. Next, to the polymerization reaction system maintained at 85° C. were added dropwise through different nozzles under stirring 175.0 g of a 80% aqueous solution of acrylic acid (hereinafter, also referred to as "80% AA"), 60.0 g of the monomer (1), 49.8 g of a 15% aqueous solution of sodium persulfate (hereinafter, also referred to as "15% NaPS"), and 19.4 g of a 35% aqueous solution of sodium bisulfite (hereinafter, also referred to as "35% SBS"). The 80% AA, the monomer (1), the 15% NaPS, and the 35% SBS were added dropwise over 180 minutes, 120 minutes, 210 minutes, and 175 minutes, respectively. Each solution was added dropwise continuously at a constant rate. After the dropwise addition, the reaction solution was maintained (aged) at 85° C. for additional 30 minutes to terminate the polymerization. After the polymerization, the polymerization reaction solution was neutralized by gradual dropwise addition of 137.8 g of a 48% aqueous solution of sodium hydroxide (hereinafter, also referred to as "48% NaOH") while the solution was stirred and cooled down. Thus, an aqueous polymer solution having a solids concentration of 46% was obtained. The weight average molecular weight of the polymer was 55,000.

Example 2

A 1,000-mL glass separable flask equipped with a reflux condenser and a stirrer (paddle fins) was charged with 100.0 g of pure water and 0.0126 g of Mohr's salt. The temperature was raised to 85° C. while stirring to prepare a polymerization reaction system. Next, to the polymerization reaction system maintained at 85° C. were added dropwise under stirring 159.4 g of 80% AA, 85.0 g of the monomer (1), 88.9 g of 15% NaPS, and 38.1 g of 35% SBS in the same manner as in Example 1. After the dropwise addition, the reaction solution was maintained (aged) at 85° C. for additional 30 minutes to terminate the polymerization. After the polymerization, the polymerization reaction solution was neutralized by gradual dropwise addition of 125.4 g of 48% NaOH while the solution was stirred and cooled down. Thus, an aqueous polymer solution having a solids concentration of 46% was obtained. The weight average molecular weight of the polymer was 18,000.

Comparative Example 1

A 45% aqueous solution of a sodium polyacrylate (produced by Nippon Shokubai Co., Ltd.) having a weight average molecular weight of 50,000 was prepared as a comparative polymer (1).

Comparative Example 2

A 1,000-mL glass separable flask equipped with a reflux condenser and a stirrer (paddle fins) was charged with 146.8 g of pure water and 0.0186 g of Mohr's salt. The temperature was raised to 85° C. while stirring to prepare a polymerization reaction system. Next, to the polymerization reaction system maintained at 85° C. were added dropwise through different nozzles under stirring 270.0 g of 80% AA, 11 g of the monomer (1), 60 g of 15% NaPS, and 20 g of 35% SBS. The 80% AA, the monomer (1), the 15% NaPS, and the 35% SBS were added dropwise over 180 minutes, 140 minutes, 190 minutes, and 175 minutes, respectively. Each solution was added dropwise continuously at a constant rate. After the dropwise addition of 80% AA, the reaction solution was maintained (aged) at 85° C. for additional 30 minutes to terminate the polymerization. After the polymerization, the polymerization reaction solution was neutralized by gradual dropwise addition of 197.5 g of 48% NaOH while the solution was stirred and cooled down. Thus, an aqueous polymer solution having a solids concentration of 45% was obtained. The weight average molecular weight of the polymer was 35,000.

Comparative Example 3

A 1,000-mL glass separable flask equipped with a reflux condenser and a stirrer (paddle fins) was charged with 146.8 g of pure water and 0.0186 g of Mohr's salt. The temperature was raised to 85° C. while stirring to prepare a polymerization reaction system. Next, to the polymerization reaction system maintained at 85° C. were added dropwise through different nozzles under stirring 270.0 g of 80% AA, 24 g of the monomer (1), 80 g of 15% NaPS, and 30 g of 35% SBS. The 80% AA, the monomer (1), the 15% NaPS, and the 35% SBS were added dropwise over 180 minutes, 140 minutes, 190 minutes, and 175 minutes, respectively. Each solution was added dropwise continuously at a constant rate. After the dropwise addition of 80% AA, the reaction solution was maintained (aged) at 85° C. for additional 30 minutes to terminate the polymerization. After the polymerization, the polymerization reaction solution was neutralized by gradual dropwise addition of 197.5 g of 48% NaOH while the solution was stirred and cooled down. Thus, an aqueous polymer solution having a solids concentration of 45% was obtained. The weight average molecular weight of the polymer was 60,000.

Measurement of Ability to Disperse Carbon Black

The polymers prepared in Examples 1 and 2 and Comparative Examples 1 to 3 were measured for ability to disperse carbon black in the following way.

In the measurement of ability to disperse carbon black, first, a buffer solution and a 0.1% aqueous polymer solution were prepared. The buffer solution was prepared as follows: pure water was added to 6.76 g of glycine, 5.26 g of sodium chloride, and 0.50 g of 48% sodium hydroxide to prepare 60.0 g of a solution in total; and to the solution were added 0.123 g of calcium chloride dihydrate, 0.056 g of magnesium chloride hexahydrate, and pure water to prepare 1000.0 g of a solution. The 0.1% aqueous polymer solution was prepared by diluting each of the polymers obtained in Examples 1 and 2 and Comparative Examples 1 to 3 with an appropriate amount of water to adjust the solids concentration of the polymer to 0.1% by mass.

Next, the solution and carbon black powder were put into a 30-mL test tube in the following order and amounts: firstly 0.03 g of carbon black powder, secondly 27.0 g of a buffer solution, and finally 3.0 g of a 0.1% aqueous polymer solution.

After putting the solution and carbon black into the test tube in such an order, the test tube was sealed and slowly inverted 60 times so that the contents are stirred. Thereafter, the test tube was allowed to stand at room temperature for 20 hours. Immediately after 20-hour standing, the supernatant was put into a 1-cm quartz cell and measured for absorbance at a UV wavelength of 380 nm using a spectrophotometer (measurement apparatus: UV-1800 produced by Shimadzu Corporation). Table 1 shows the results. Higher absorbance indicates higher dispersion of the carbon black powder.

TABLE 1

| Polymer | Mw | Ratio between structural units (% by mass) Structural unit (A)/ Structural unit (B) | Absorbance |
| --- | --- | --- | --- |
| Example 1 | 55000 | 30/70 | 1.00 |
| Example 2 | 18000 | 40/60 | 1.52 |
| Comparative Example 1 | 50000 | 0/100 | 0.01 |
| Comparative Example 2 | 35000 | 5/95 | 0.27 |
| Comparative Example 3 | 60000 | 10/90 | 0.79 |

The invention claimed is:

1. A hydrophobic group-containing copolymer comprising:
   a structural unit (A) derived from a hydrophobic group-containing monomer; and
   a structural unit (B) derived from a carboxylic acid-based monomer,
   the hydrophobic group-containing monomer being represented by the formula (2):

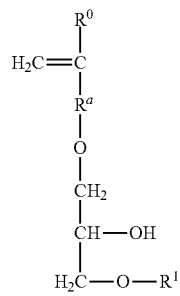

wherein $R^0$ represents a hydrogen atom or a $CH_3$ group; $R^a$ represents a $CH_2$ group, a $CH_2CH_2$ group, or a direct bond; and $R^1$ represents a C1-C20 hydrophobic organic group,
   the proportion of the structural unit (A) being from 30% by mass to 45% by mass based on 100% by mass of the structural units derived from all monomers constituting the copolymer, and
   the copolymer having a weight average molecular weight of 10,000 to 100,000.

2. The hydrophobic group-containing copolymer according to claim 1,
   wherein the copolymer includes a structural unit derived from a sulfonic acid (salt) group-containing monomer.

3. The hydrophobic group-containing copolymer according to claim 1,
   wherein the copolymer has a weight average molecular weight of 18,000 to 100,000.

4. A detergent composition comprising:
   the copolymer according to claim 1; and
   a surfactant.

5. A method for preparing a detergent composition comprising adding the copolymer according to claim 1 to a detergent.

* * * * *